(12) United States Patent
Symons et al.

(10) Patent No.: US 6,351,350 B1
(45) Date of Patent: Feb. 26, 2002

(54) SHOCK LIMITER SYSTEM FOR A HEAD SUSPENSION

(75) Inventors: John B. Symons; Yiduo Zhang, both of Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 0 days.

(21) Appl. No.: 09/458,238

(22) Filed: Dec. 9, 1999

(51) Int. Cl.[7] ............................................... G11B 5/596
(52) U.S. Cl. .................. 360/244.9; 360/245; 360/245.7
(58) Field of Search .............................. 360/244.9, 245, 360/245.7

(56) References Cited

U.S. PATENT DOCUMENTS

| | | | |
|---|---|---|---|
| 5,333,085 A | | 7/1994 | Prentice et al. |
| 5,422,770 A | * | 6/1995 | Alt .............................. 360/104 |
| 5,446,612 A | | 8/1995 | Thornton et al. |
| 5,808,837 A | | 9/1998 | Norton |
| 5,831,793 A | | 11/1998 | Resh |
| 5,926,347 A | | 7/1999 | Kouhei et al. |
| 5,936,804 A | | 8/1999 | Riener et al. |
| 5,949,617 A | | 9/1999 | Zhu |
| 5,973,884 A | | 10/1999 | Hagen |

FOREIGN PATENT DOCUMENTS

| | | |
|---|---|---|
| JP | 9-223759 | 7/1997 |
| JP | 9-282823 | 10/1997 |
| JP | 10-69743 | 3/1998 |
| JP | 10-241310 | 9/1998 |
| JP | 11-53855 | 2/1999 |
| JP | 11-66522 | 3/1999 |
| JP | 11-66766 | 3/1999 |
| JP | 11-213581 | 8/1999 |
| KR | 98-4659 | 3/1998 |
| WO | WO 99/27533 | 6/1999 |
| WO | WO 00/30078 | 5/2000 |

* cited by examiner

*Primary Examiner*—Robert S. Tupper
(74) *Attorney, Agent, or Firm*—Faegre & Benson LLP (57) ABSTRACT

A shock limiter system for a head suspension configured to engage with an external structure in a rigid disk drive. The head suspension has a flexure with a head slider oriented in a first direction over a disk surface. The head suspension includes a load beam having a mounting region, a rigid region and a spring region located between the mounting region and rigid region. The rigid region and the flexure define a distal region of the head suspension. The shock limiter system comprises a shock limiter extending from the distal region in a second direction generally opposite the first direction. The shock limiter is positioned on the distal region to engage with the external structure to limit movement of the head suspension away from the disk surface during a shock event.

32 Claims, 9 Drawing Sheets

SHOCK LIMITER SYSTEM FOR A HEAD SUSPENSION

FIELD OF THE INVENTION

The present invention is directed to a shock limiter system for a head suspension in a rigid disk drive, and in particular, to a head suspension having a shock limiter formed in the portion of the load beam or the flexure positioned to engage with an external structure.

BACKGROUND OF THE INVENTION

In a dynamic rigid disk storage device, a rotating disk is employed to store information. Rigid disk storage devices typically include a frame to provide attachment points and orientation for other components, and a spindle motor mounted to the frame for rotating the disk. A read/write head is formed on a "head slider" for writing and reading data to and from the disk surface. The head slider is supported and properly oriented in relationship to the disk by a head suspension that provides both the force and compliance necessary for proper head slider operation. As the disk in the storage device rotates beneath the head slider and head suspension, the air above the disk also rotates, thus creating an air bearing which acts with an aerodynamic design of the head slider to create a lift force on the head slider. The lift force is counteracted by a spring force of the head suspension, thus positioning the head slider at a desired height and alignment above the disk that is referred to as the "fly height."

Head suspensions for rigid disk drives include a load beam and a flexure. The load beam includes a mounting region at its proximal end for mounting the head suspension to an actuator of the disk drive, a rigid region, and a spring region between the mounting region and the rigid region for providing a spring force to counteract the aerodynamic lift force generated on the head slider during the drive operation as described above. The flexure typically includes a gimbal region having a slider-mounting surface where the head slider is mounted. The gimbal region is resiliently moveable with respect to the remainder of the flexure in response to the aerodynamic forces generated by the air bearing. The gimbal region permits the head slider to move in pitch and roll directions and to follow disk surface fluctuations.

In one type of head suspension the flexure is formed as a separate piece having a load beam-mounting region that is rigidly mounted to the distal end of the load beam using conventional methods such as spot welds. Head suspensions of this type typically include a load point dimple formed in either the load beam or the gimbal region of the flexure. The load point dimple transfers portions of the load generated by the spring region of the load beam to the flexure, provides clearance between the flexure and the load beam, and serves as a point about which the head slider can gimbal in pitch and roll directions to follow fluctuations in the disk surface.

The actuator arm is coupled to an electromechanical actuator that operates within a negative feedback, closed-loop servo system. The actuator moves the data head radially over the disk surface for track seek operations and holds the transducer directly over a track on the disk surface for track following operations.

In prior drives, when shock forces are imparted on the drives, moments are induced on both the actuator arms and on the disks themselves causing the actuator arms and the disks to deflect and move relative to one another. If the forces are great enough, the actuator arm, or baseplate, comes into contact with the disk surface. Such contact is highly detrimental to the disk surface and can destroy large portions of the disk surface rendering those portions unfit for operation. Even with smaller shocks, head slap can be induced in the disk drive. Head slap occurs when a shock separates the read/write head from the disk and the return force causes the read/write head to crash into the disk surface, potentially destroying portions of the disk surface.

One option for addressing this problem includes making the actuator arms stiffer by making them thicker. This solution requires more room in the axial direction and may result in the loss of a disk or a disk surface in the disk drive, thus sacrificing storage capacity.

U.S. Pat. No. 5,926,347 (Kouhei et al.) discloses a mechanism for preventing the magnetic head from being spaced away from the face of the magnetic disk medium when the magnetic disk medium is in the stopped or parked condition. The device of Kouhei does not limit movement of the magnetic head when the disk drive is in operation.

U.S. Pat. No. 5,808,837 discloses a system for limiting the deflection of the load beam during a shock event, including a separate cantilevered element that extends away from the mounting region towards the flexure. In this design, the length of the cantilevered portion of the cantilevered element is very short in comparison to the length of the load beam. Therefore, the amount of slider lift-off cannot be tightly controlled with current manufacturing tolerances. In addition, this approach requires the manufacturing and assembly of an additional component. The device of JP 11-66766 suffers from the same shortcomings.

U.S. Pat. No. 5,831,793 (Resch) discloses a cantilever leaf spring located in the radius region of the load beam that is formed towards the disk surface. The leaf spring is designed to rub on the disk surface just prior to base plate-to-disk impact. The leaf spring decelerates the suspension assembly, but does not limit the slider-to-disk separation or impact velocity. That is, the device of Resch limits the movement of the suspension assembly toward the disk, but does not address slider separation from the disk surface.

A need still exists, however, for an improved head suspension including a mechanism capable of limiting motion of the suspension during disk operation away from the surface of the disk due to impact and shock loading. Such a mechanism should work within the requirements of hard disk drive suspensions, including overall weight limitations, height limitations, manufacturability and functionality.

SUMMARY OF THE INVENTION

The present invention meets the ongoing need for improved head suspensions by providing a head suspension with a shock limiter that limits slider lift-off of head suspensions during operation of the rigid disk drive and/or when the head suspensions are parked. The shock limiter can be located in the rigid region or on the flexure (referred to collectively as the distal region). The shock limiter extends away from the head suspension in a direction opposite from the direction of the head slider. The shock limiter is configured to engage with an exterior structure separate from the head suspension. The exterior structure can be a portion of an actuator arm, a portion of the disk drive housing, a back-to-back head suspension or other structures separate from the head suspension.

In one embodiment, the shock limiter system for a head suspension is configured to engage with an external structure in a rigid disk drive. The head suspension has a flexure with a head slider oriented in a first direction over a disk surface. The head suspension includes a load beam having a mounting region, a rigid region and a spring region located between the mounting region and rigid region. The rigid region and the flexure define a distal region of the head suspension. The shock limiter system comprises a shock limiter extending from the distal region in a second direction generally opposite the first direction. The shock limiter is positioned on the distal region to engage with the external structure to limit movement of the head suspension away from the disk surface during a shock event.

In another embodiment, the shock limiter system comprises a shock limiter extending from the distal region in a second direction generally opposite the first direction and an external structure located opposite the shock limiter. The external structure is positioned to limit movement of the head suspension away from the disk surface during a shock event.

In yet another embodiment, the shock limiter system is configured for first and second back-to-back head suspensions in a head stack assembly. The head suspensions have first and second flexures supporting first and second head sliders over first and second disk surfaces in a rigid disk drive, respectively. The first and second head suspensions each include a load beam having a mounting region, a rigid region and a spring region located between the mounting region and rigid region. The first rigid region and the first flexure define a first distal region. The shock limiter system comprises a first shock limiter formed in the first distal region. The first shock limiter extends toward the second head suspension and limits movement of the first and second head suspensions away from the first and second disk surfaces during a shock event.

The shock limiter system for the back-to-back head suspensions may optionally include a second shock limiter formed in the second distal region. The second shock limiter extends toward the first head suspension. The first and second shock limiters preferably cooperate to limit movement of the first and second head suspensions away from the first and second disk surfaces during a shock event.

In the various embodiments, the shock limiter may be located on the rigid region or the flexure. The shock limiter may be integrally formed with the rigid region or the flexure. The shock limiter may have a curved structure and/or a tip configured to engage with the external structure. In one embodiment, the shock limiter has a tip adjacent to the head slider. In another embodiment, the shock limiter is a spring member. The shock limiter preferably limits movement of the suspension away from the disk surface when the head suspensions are parked or during operation of the rigid disk drive.

DETAILED DESCRIPTION OF THE INVENTION

Figure 1:
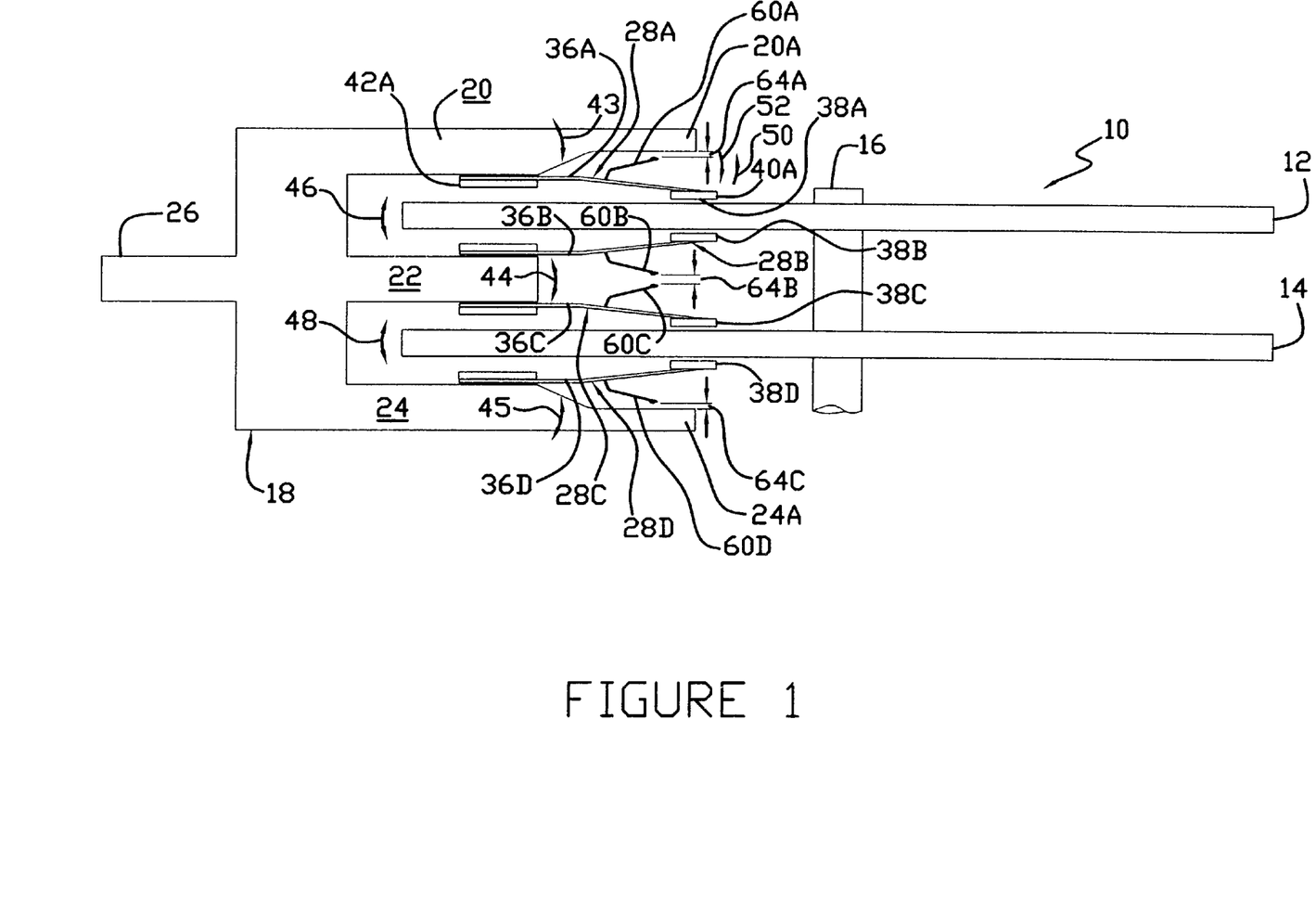
FIG. 1 a side view of a hard disk drive with a head stack assembly in accordance with the present invention.

FIG. 1 is a side view of a portion of a disk drive 10 in accordance with the present invention. Disk drive 10 includes a plurality of magnetic disks 12 and 14 mounted for rotation about a spindle 16. A plurality of actuator arms 20, 22 and 24 are coupled to a voice coil 26. A plurality of head suspension assemblies 28A, 28B, 28C, and 28D are coupled to actuator arms 20, 22 and 24 forming a head stack assembly 18. The servo positioning system (not shown) interacts with voice coil 26 to rotate head stack assembly 18 relative to disks 12 and 14.

During operation, the head stack assembly 18 simultaneously moves all of the head suspension assemblies 28A, 28B, 28C, 28D in a radial direction relative to the surfaces of disks 12 and 14. The phrase "during operation of the disk drive" refers to a mode when the head stack assembly 18 is free to move the head suspension assemblies 28A, 28B, 28C, 28D in a radial direction relative to the rotating disks 12, and 14.

Head suspension assemblies 28A, 28B, 28C, and 28D contain some common features that will be described in the context of head suspension assembly 28A. Head suspension assembly 28A includes load beam 36A, coupled to slider 38A. Slider 38A, in turn, supports a transducer 40A. Load beam 36A is coupled to actuator arm 20 by baseplate 42A. In one embodiment, the load beam 36A is sandwiched between baseplate 42A and actuator arm 20. In one preferred embodiment, those elements are ball-swaged together to form a substantially rigid connection therebetween.

Load beam 36A is resilient in a direction 50 generally normal to the surface of disk 12 and is biased to exert a downward force on slider 38A toward the surface of disk 12. Slider 38A includes a hydrodynamic air bearing which, upon sufficient angular velocity of disk 12 about spindle 16, develops a hydrodynamic lifting force that lifts slider 38A off of the surface of disk 12. When the hydrodynamic lifting force reaches a sufficient magnitude, the slider 38A lifts off of the surface of disk 12 and flies above that surface carrying transducer 40A with it. In this way, transducer 40A flies above the surface of disk 12 sensing the magnetic flux reversals encoded on disk, or encoding magnetic flux reversals on disk 12.

When disk drive 10 is subjected to a shock event, such as when it is dropped or struck, actuator arms 20, 22, and 24 and disks 12, 14 can deflect. For instance, assuming that sufficient shock is imparted in disk drive 10, actuator arms 20 and 22 deflect in the direction generally indicated by arrows 43, 44 and 45. The edges of disks 12 and 14 can also deflect in the direction generally indicated by arrows 46 and 48.

One particular destructive type of deflection known as "head slap". Head slap occurs when a shock separates the read/write head from the disk and the return force causes the read/write head to crash into the disk surface. The forces generated during impact often collapses the air bearing and causes physical contact between the slider and the disk surface, potentially destroying portions of the disk surface. For example, a shock even may cause the slider 38A to move away from the disk 12 in the direction 50. Once the maximum deflection of the slider 38A is reached, the load beam 36A acts as a spring member to force the slider 38A in the direction 52 toward the disk 12. If the shock is sufficiently strong, the slider 38A will contact or "slap" against the disk 12.

In the embodiment illustrated in FIG. 1, the head suspensions 28A, 28B, 28C and 28D each include shock limiters 60A, 60B, 60C and 60D formed in respective load beams 36A, 36B, 36C and 36D. The shock limiters 60A, 60B, 60C and 60D each extend in a direction opposite the direction of the operative surface of the respective sliders 38A, 38B, 38C and 38D. As used herein, shock limiter refers to a member on the rigid region of the load beam or the flexure that extends in a direction opposite than the direction of the slider on that head suspension assembly.

Each of the shock limiters 60A, 60B, 60C and 60D is configured to engage with an external structure. As used herein, "external structure" refers to a component separate from the particular head suspension, such as a portion of an actuator arm, a portion of the disk drive, or an adjacent back-to-back head suspension. Head suspensions are back-to-back when adjacent to each other in the same head stack assembly and the surfaces of the sliders that contact the disk surface face away from each other. For example, slider 38B on the up head suspension 28B faces upward to contact the bottom of disk 12 and slider 38C on the down head suspension 28C faces downward to contact the top of disk 14. Head suspension assemblies 28B and 28C are back-to-back head suspensions.

For the head suspension 28A, the external structure is an extension 20A of the actuator arm 20. The shock limiter 60A is separated from the extension 20A by a gap 64A. The gap 64A determines the amount of deflection the head suspension 28A is permitted before encountering resistance from the shock limiters 60A. Similarly, for the head suspension 28D, the external structure is an extension 24A of the actuator arm 24. The shock limiter 60D is separated from the extension 24A by a gap 64C. The gap 64C determines the amount of deflection the head suspension 28D is permitted before encountering resistance from the shock limiters 60D.

During normal operation of the disk drive 10, the shock limiters 60A, 60D typically do not touch the extensions 20A, 24A, respectively. During a large shock event, one of the sliders 38A or 38D may begin to separate from their respective disk surfaces 12, 14. This movement closes the gaps 64A, 64C between the two shock limiters 60A, 60D and their respective external structures 20A, 24A. Once the gaps 64A, 64C are closed, any further slider displacement is resisted by both the normal suspension spring force and the compression of the two shock limiters 60A, 60D. The shock limiters 60A, 60D preferably deform elastically during a shock event. The shock limiters 60A, 60D greatly reduces both magnitude of the slider separation from the disk and the returning slider impact velocity. Dynamic modeling indicates a significant reduction in both the slider separation distance from the disk and the impact velocity in head suspensions using the present shock limiters. By reducing the impact velocity, the kinetic energy available to cause disk damage during head slap is dramatically reduced.

For the back-to-back head suspensions 28B and 28C, the shock limiter 60B is the external structure for the shock limiter 60C, and visa versa. The shock limiters 60B, 60C are separated by a gap 64B. The gap 64B determines the amount of deflection each of the back-to-back head suspensions 28B, 28C are permitted before encountering resistance from the shock limiters 60B, 60C.

During normal operation of the disk drive 10, the shock limiters 60B, 60C typically do not touch one another and have no affect on the gram load or suspension performance. During a large shock event, one or both of the sliders 38B or 38C may begin to separate from their respective disk surfaces 12, 14. This movement closes the gap 64B between the two shock limiters 60B, 60C. Once the gap 64B is closed, the shock limiters 60B, 60C contact each other and any further slider displacement is resisted by both the normal suspension spring force and the compression of the two shock limiters 60B, 60C. The shock limiters 60B, 60C preferably deform elastically during a shock event. The shock limiters 60B, 60C greatly reduces both magnitude of the slider separation from the disk and the returning slider impact velocity. Dynamic modeling indicates the same reduction in both the slider separation distance from the disk and the impact velocity in head suspensions as provided by the shock limiters 60A, 60D.

In the embodiment illustrated in FIG. 1, the shock limiters 60A, 60B, 60C and 60D are cantilevered leaf springs made from the load beam material near the respective sliders 38A, 38B, 38C and 38D. The shock limiters 60A, 60B, 60C and 60D preferably have sufficient resiliency to deform elastically during merging of the head stack assembly 18 with the disks 12, 14. Merging refers to temporarily deflecting the head suspensions 28A, 28B, 28C and 28D sufficiently to permit positioning the head stack assembly 18 over the disks 12, 14, such as described in commonly assigned U.S. patent application Ser. No. 08/922,195, entitled Head Suspension Having Conductor Protecting Standoffs, filed Sep. 2, 1997. The magnitude of deformation of the shock limiters 60A, 60B, 60C, 60D during merging can be greater than, less than, or equal to the magnitude of deformation during a typical shock event.

Figure 2:
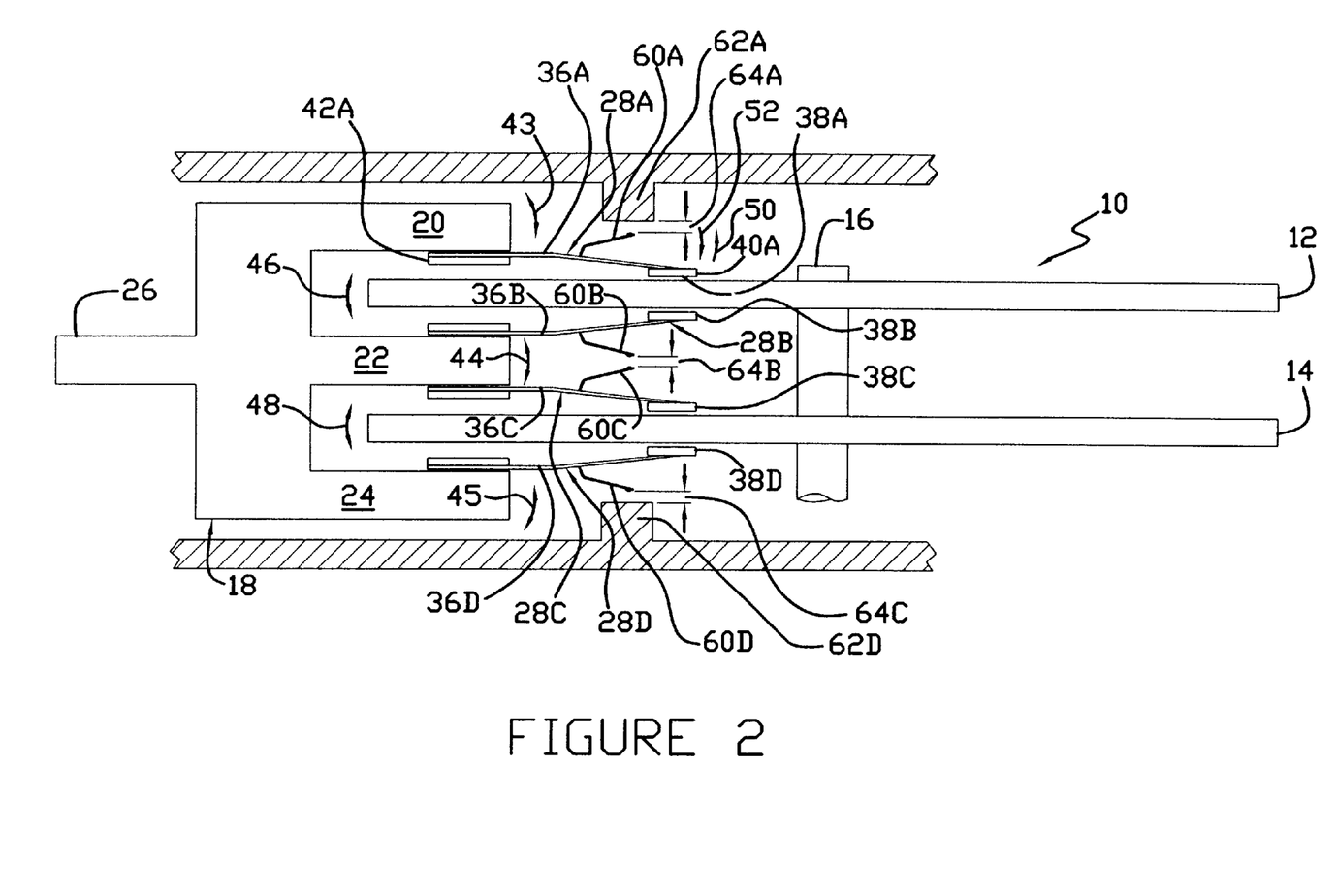
FIG. 2 a side view of an alternate hard disk drive with a head stack assembly in accordance with the present invention.

FIG. 2 illustrates an alternate embodiment of the disk drive illustrated in FIG. 1, where all of the reference numerals are the same, except that the actuator arms 20, 24 lack the extensions 20A, 24A. The external structures positioned to engage with the shock limiters 60A, 60D are members 62A, 62D. Members 62A, 62D are typically arc shaped to correspond to the arc traced by the head stack assembly during operation of the disk drive and are located on a portion of the disk drive separate from the head stack assembly 18, such as on the disk drive housing or similar structure.

Figure 3:
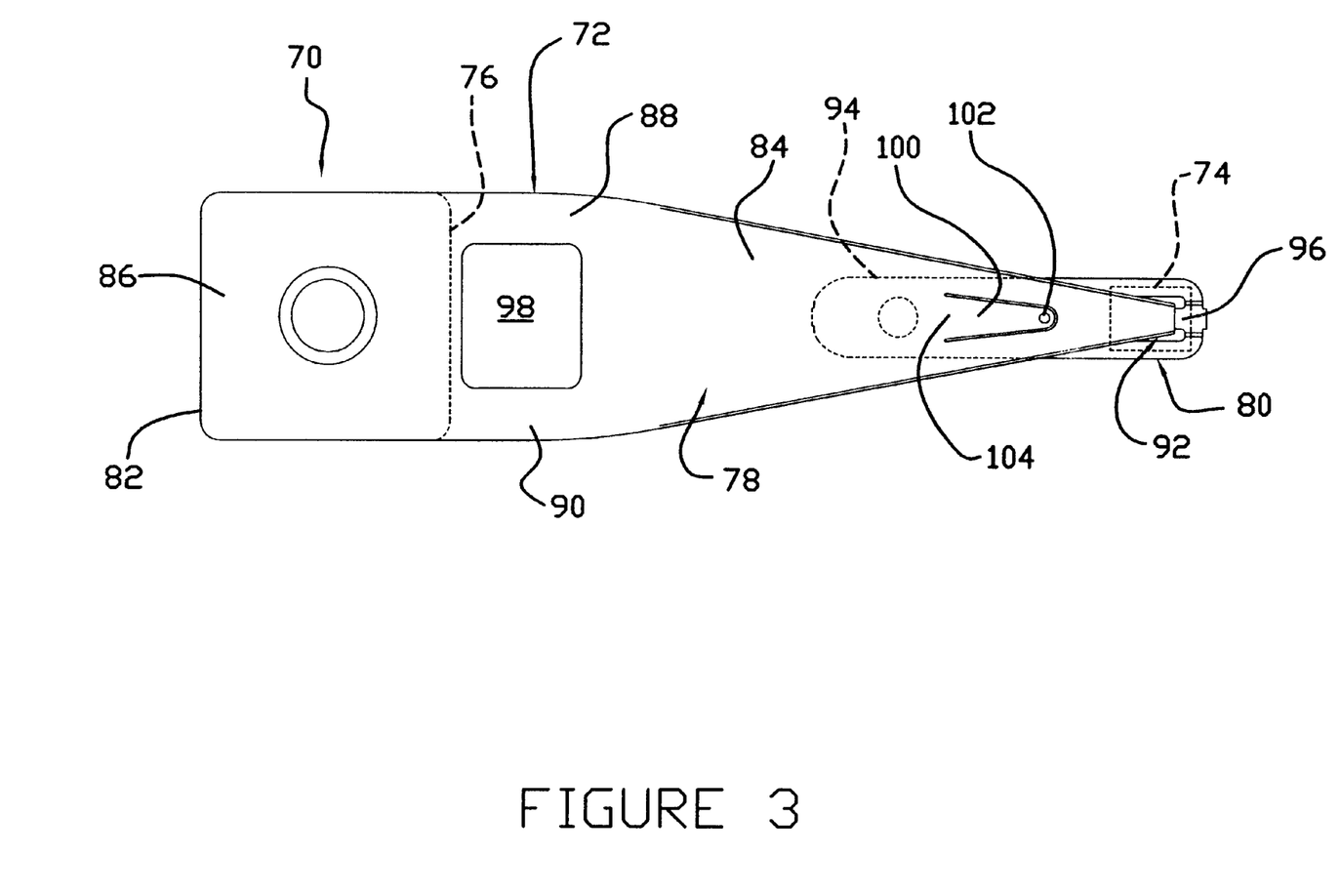
FIG. 3 is a top view of a head suspension assembly with a shock limiter on the load beam in accordance with the present invention.

FIG. 3 illustrates a top view of an alternate head suspension assembly 70 in accordance with the present invention. The head suspension assembly 70 includes a head suspension 72 in accordance with the present invention, a slider 74, and a base plate 76. The head suspension 72 includes a load beam 78 and a flexure 80. The base plate 76 can be conventionally fixed to an actuator mounting region (see FIG. 1) located at the proximal end 82 of the load beam 78, such as by welding. The load beam 78 has a rigid region 84, a mounting region 86, and a spring region 88 located between the rigid region 84 and the mounting region 86. The spring region 88 typically includes a bend or radius 90 and provides a load to the rigid region 84 with respect to the mounting region 86. The rigid region 84 is provided with stiffening rails, as are well known to enhance stiffness properties. As used herein, "distal region" refers to the rigid region and the flexure of the head suspension.

The flexure 80 extends from the distal end 92 of the load beam 78. The flexure 80 is typically constructed as a separate element of the head suspension 72 and is co-extensive with the rigid region 84 of the load beam 78. The flexure 80 comprises a load beam mounting region 94 and a gimbal 96 and is generally co-planar with the load beam 78. The flexure 80 is secured to the load beam 78 in a conventional manner, such as by welding the load beam mounting region 94 to the rigid region 84 of the load beam 78.

The spring region 88 of the load beam 78 provides a spring force load to the slider 74 through the flexure 80 at the distal end 92 of the load beam 78. The spring force is typically developed by a pre-formed bend or radius 90 that functionally biases the slider 74 towards the surface of the disk when the disk drive is in use. The degree of the bend or radius 90 is determined by both the predetermined offset height of the slider 74 over the non-moving disk and the gram load needed to counteract the aerodynamic lift force generated on the slider 74 when it flies over the moving disk. The spring region 88 may also include a spring aperture 98 used to adjust or tune spring characteristics (such as stiffness) of the spring region 88, and thus the gram loading, by removal of spring region material. Such adjustment of the spring stiffness has the added benefit of reducing the overall weight of the head suspension 70.

The shock limiter 100 is formed in the rigid region 84 of the load beam 78. The shape of the shock limiter 100 is etched through the load beam 78 and then formed out of plane (see FIG. 4). The shock limiter 100 is located on the opposite side of the head suspension 72 as the slider 74. The height of the shock limiter 100 is controlled so that the minimum clearance will exist between back-to-back head suspension assemblies 72 when assembled in the drive (see FIG. 1).

In the illustrated embodiment, the shock limiter 100 includes a tip 102 that is preferably located as close to the slider 74 as possible. The triangular shape of the head suspension 72 allows uniform stress distribution across the shock limiter 100 and reduces the size of the limiter. The shock limiter 100 typically has a length of about 1 millimeter to about 2 millimeters, depending on the thickness of the load beam 78.

Figure 4:
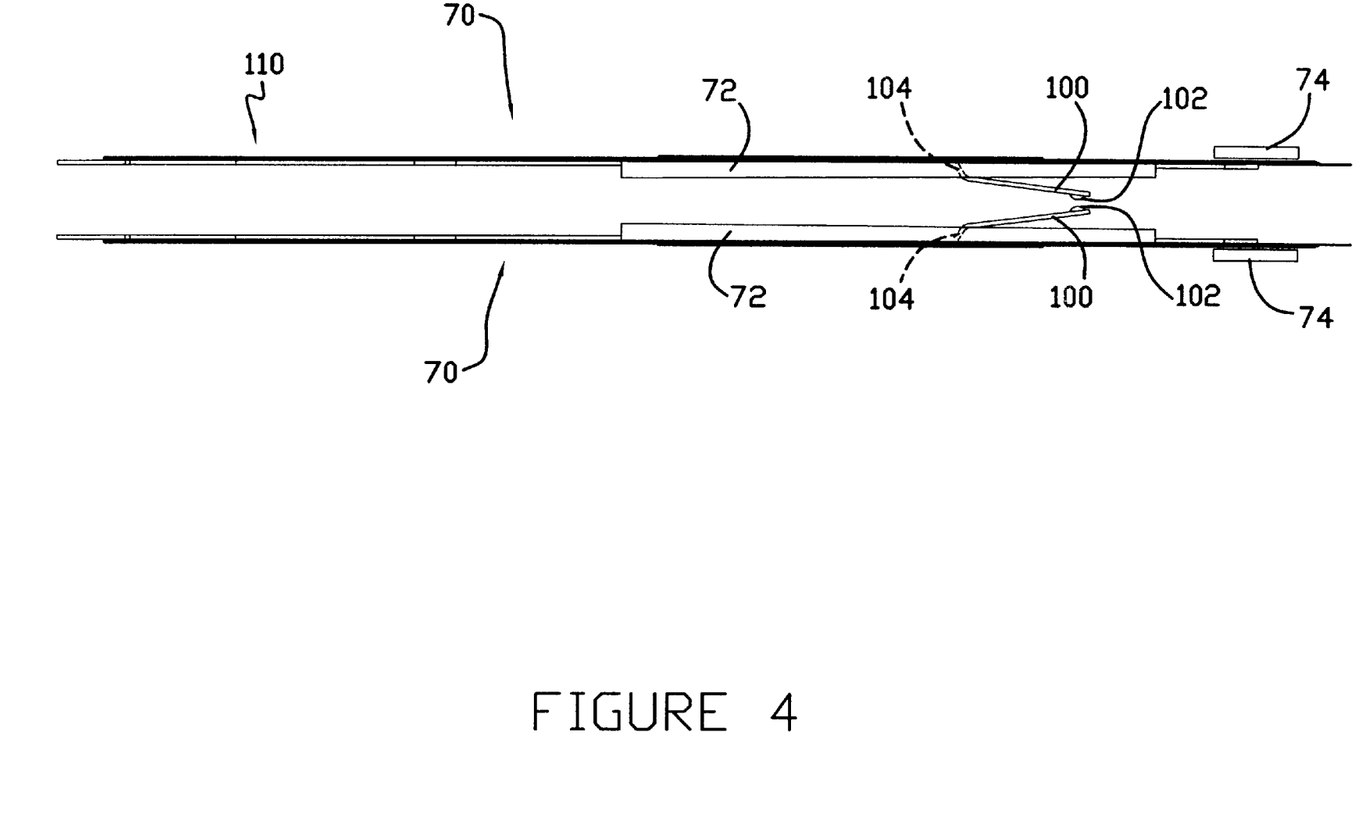
FIG. 4 is a side view of the head stack assembly using the head suspension shown in FIG. 3.

FIG. 4 is a side view of a pair of the head suspensions 70 of FIG. 3 in a head stack assembly 110. The side view of the shock limiter 100 can be formed into a variety of different profiles. If the shock limiter 100 is curved, the point of contact will roll closer to the limiter base 104. A curved profile will also shorten effective cantilever spring length and cause a rising rate forcedeflection curve. The amount of cantilever in the shock limiter 100 may be useful in fine tuning the limiter spring rate and shock performance. Alternatively, the shock limiter can be formed as a step offset with a large diameter dimple at the tip 102.

Figure 5:
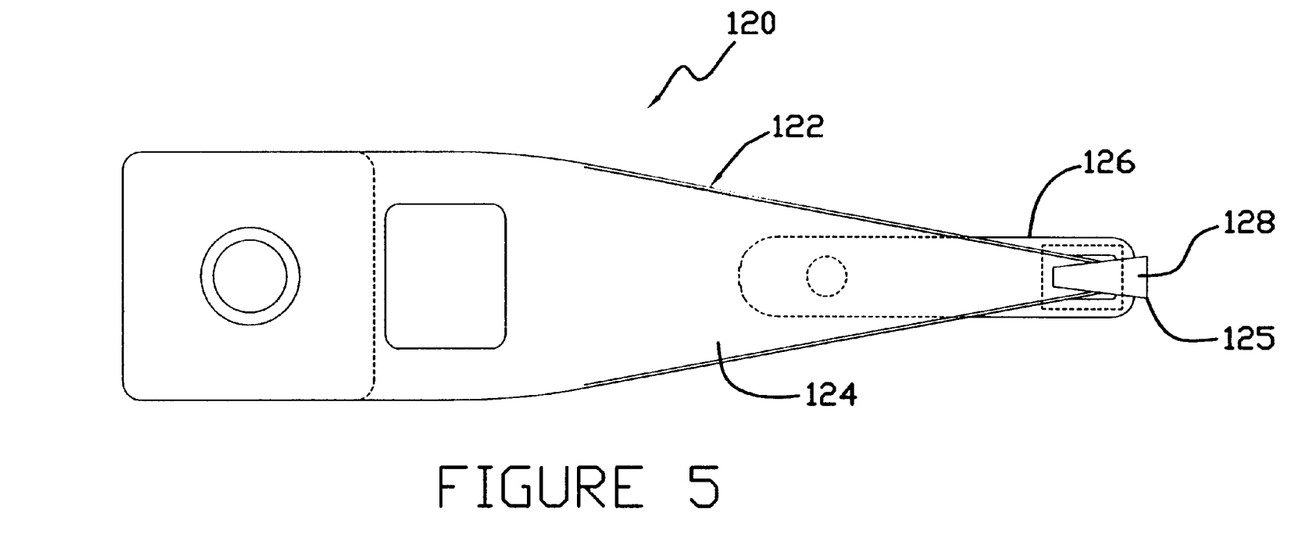
FIG. 5 is a top view of an alternate head suspension assembly with a shock limiter on the load beam in accordance with the present invention.
Figure 6:
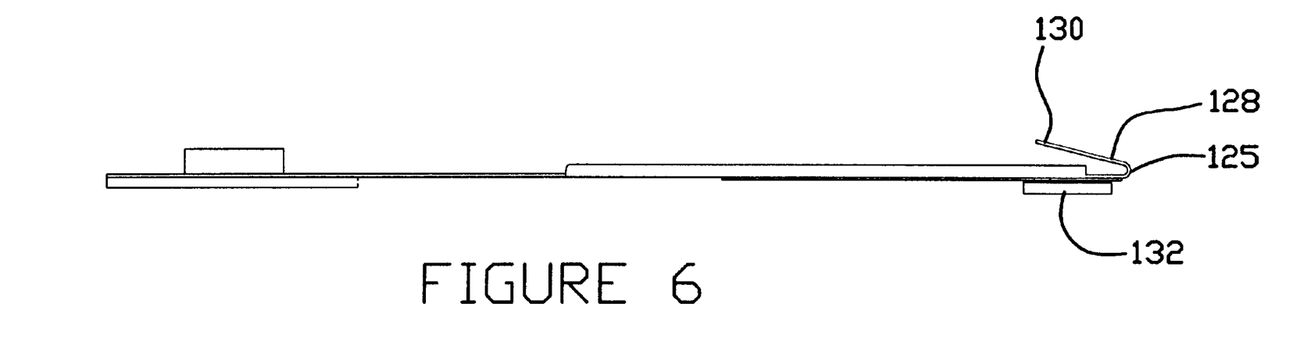
FIG. 6 is a side view of the head suspension shown in FIG. 5.

FIGS. 5 and 6 illustrate an alternate head suspension assembly 120 in accordance with the present invention. The head suspension assembly 120 includes a head suspension 122 with a load beam 124 and flexure 126. Shock limiter 128 is formed at distal end 125 of load beam 124, as best-illustrated in FIG. 6. The head suspension assembly 120 may be used in a back-to-back configuration or with a variety of other external structures. In one embodiment, the shock limiter 128 is integrally formed with the load beam 124. In the illustrated embodiment, tip 130 of the shock limiter 128 is centrally located over slider 132 to minimize slider deflection during a shock event.

Figure 7:
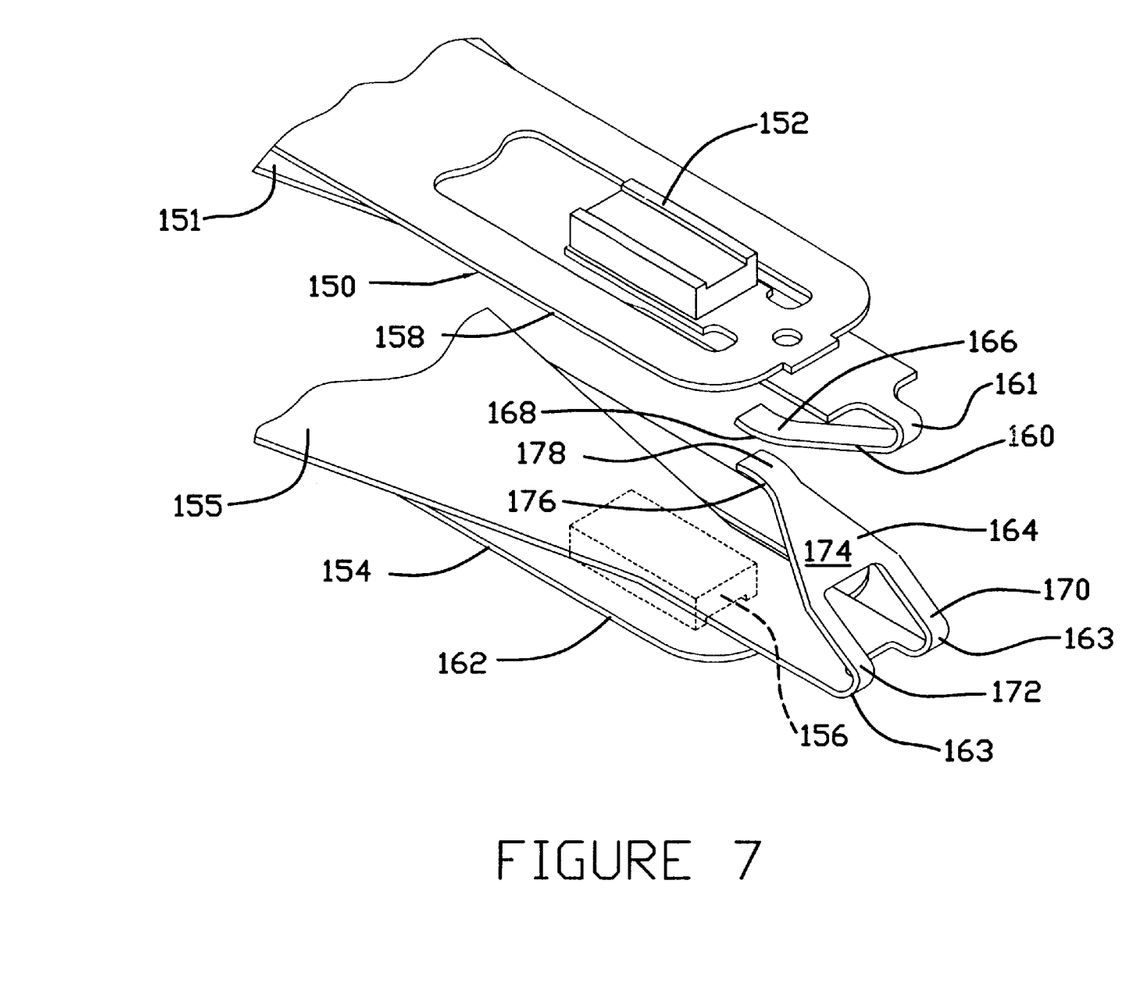
FIG. 7 is a perspective view of a pair of alternate shock limiters in accordance with the present invention.

FIG. 7 illustrates alternate shock limiter structures in accordance with the present invention. Up head suspension 150 includes a slider 152 on flexure 158 configured functionally upward. Down head suspension 154 includes a slider 156 on flexure 162 arranged in a functional direction opposite of slider 152. The head suspensions 150, 154 are back-to-back head suspensions. Load beam 151 of head suspension 150 includes an integrally formed shock limiter 160. Similarly, load beam 155 of head suspension 154 includes an integrally formed shock limiter 164.

Shock limiter 160 is configured as a single ribbon of material with a slight radius 166 near tip 168. Shock limiter 164 includes a pair of arms 170, 172 that combine at contact region 174. Contact region 174 includes a slight radius 176 near tip 178. The spring rate of the shock limiter 160 can be greater than, less than or equal to the spring rate of the shock limiter 164. The location of the tips 168, 178 relative to the respective sliders 152, 156 can be adjusted by modifying the location and amount of bends 161, 163. Although the head suspensions 150, 154 of FIG. 7 are shown in a back-to-back configuration, other external structures may also be used.

Figure 8:
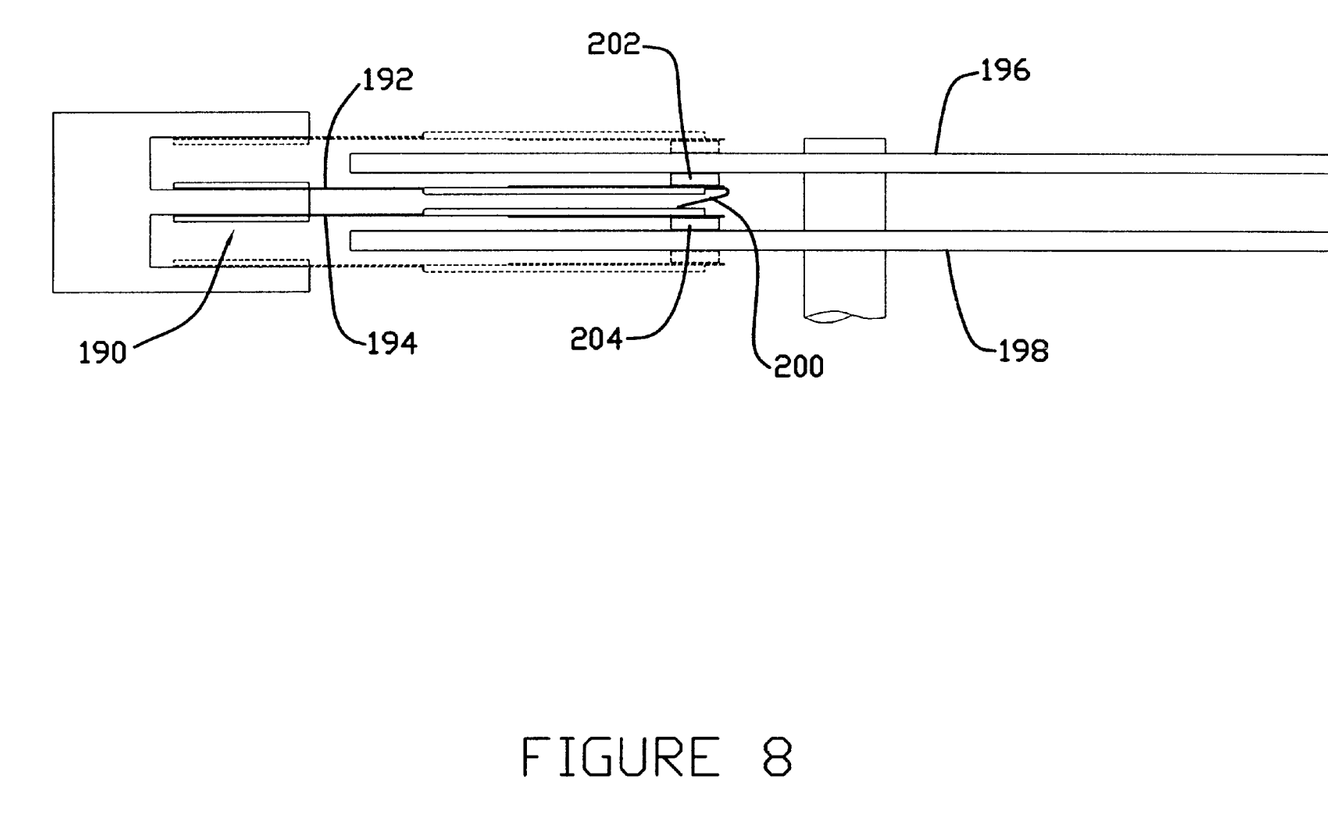
FIG. 8 a side view of a hard disk drive including an alternate head stack assembly in accordance with the present invention.

FIG. 8 illustrates an alternate head stack assembly in which only head suspension 192 of the back-to-back head suspensions 192, 194 includes a shock limiter in accordance with the present invention. Head stack assembly 190 includes an up head suspension 192 and an adjacent down head suspension 194. The head suspensions 192, 194 are back-to-back head suspensions with respect to disks 196, 198, respectively. Head suspension 192 includes shock limiter 200 positioned to engage with the back-to-back head suspension 194, while head suspension 194 does not include a shock limiter. Shock limiter 200 serves to limit both the separation of the slider 202 from the disk 196 and the separation of the slider 204 from the disk 198.

Figure 9:
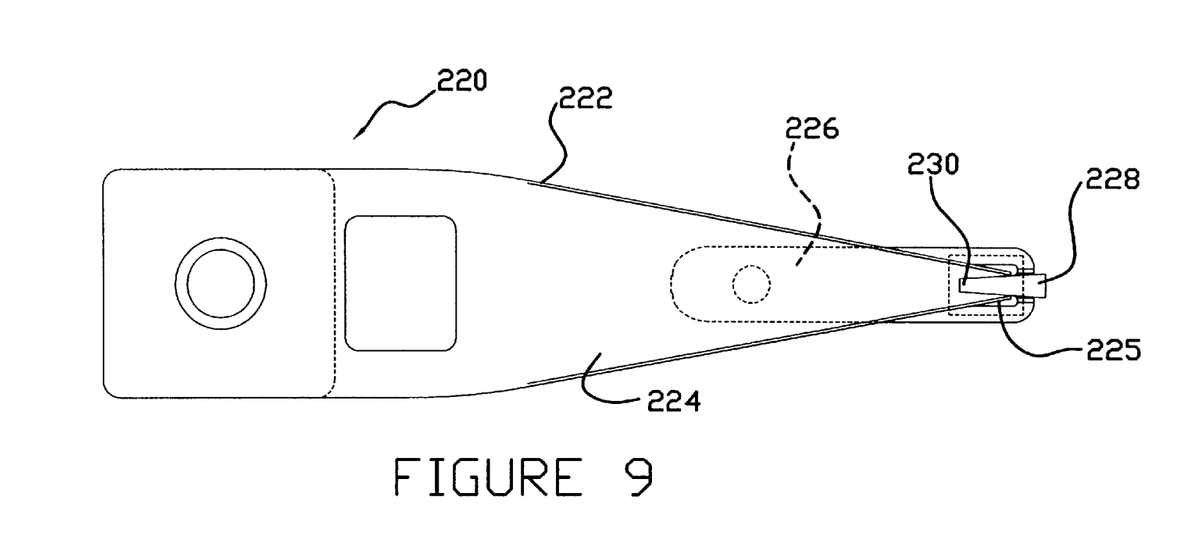
FIG. 9 is a top view of a head suspension assembly with the shock limiter on the flexure in accordance with the present invention.
Figure 10:
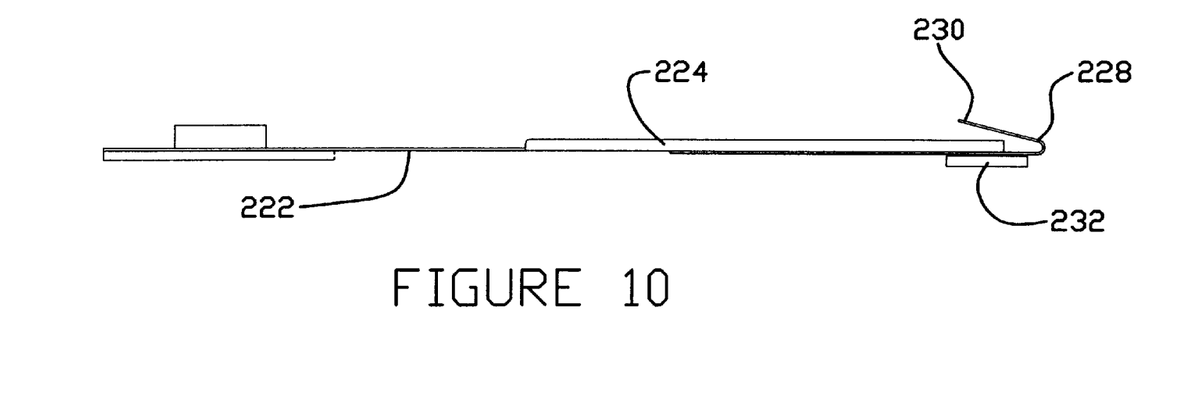
FIG. 10 is a side view of the head suspension shown in FIG. 9.

FIGS. 9 and 10 illustrate an alternate head suspension assembly 220 in accordance with the present invention. The head suspension assembly 220 includes a head suspension 222 with a load beam 224 and flexure 226. Shock limiter 228 is formed in the flexure 226 and is located at distal end 225 of load beam 224, as best-illustrated in FIG. 10. The head suspension assembly 220 may be used in a back-to-back configuration or with a variety of other external structures. In one embodiment, the shock limiter 228 is integrally formed with the flexure 226. In the illustrated embodiment, tip 230 of the shock limiter 228 is centrally located over slider 232 to minimize slider deflection during a shock event.

Figure 11:
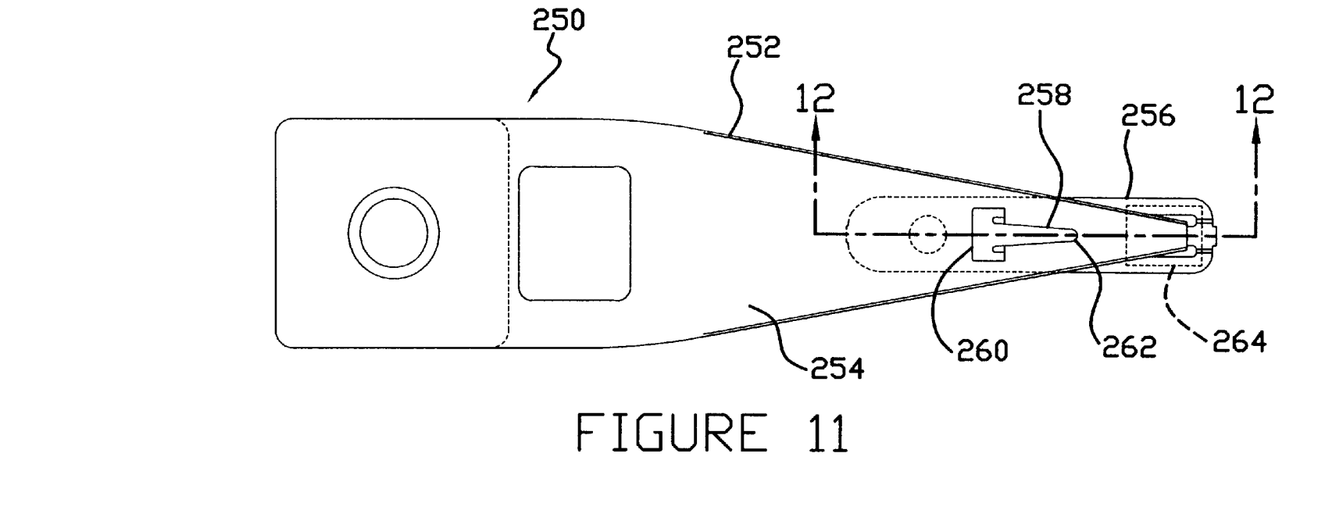
FIG. 11 is a top view of an alternate head suspension assembly with the shock limiter on the flexure in accordance with the present invention.
Figure 12:
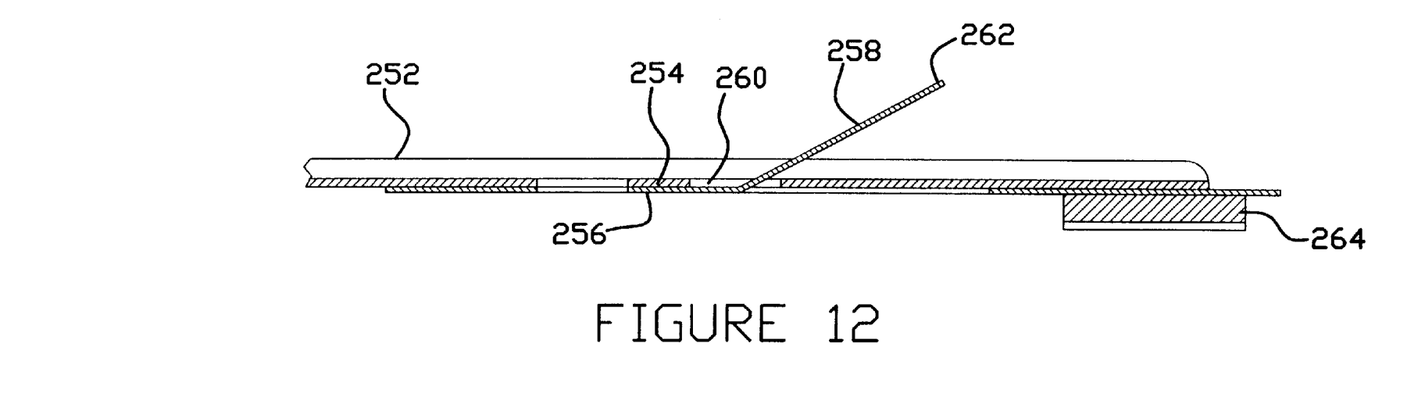
FIG. 12 is a cross-sectional view of the head suspension shown in FIG. 11.

FIGS. 11 and 12 illustrate an alternate head suspension assembly 250 in accordance with the present invention. The head suspension assembly 250 includes a head suspension 252 with a load beam 254 and flexure 256. Shock limiter 258 is formed in the flexure 256. The shock limiter 258 extends through an opening 260 in the load beam 254, as best-illustrated in FIG. 12. The head suspension assembly 250 may be used in a back-to-back configuration or with a variety of other external structures. In one embodiment, the shock limiter 258 is integrally formed with the flexure 256.

In the illustrated embodiment, tip 262 of the shock limiter 258 is longitudinally off-set from slider 264.

Although the present invention has been described with reference to preferred embodiments, workers skilled in the art will recognize that changes may be made in form and detail without departing from the spirit and scope of the invention. In addition, the invention is not to be taken as limited to all of the details thereof as modifications and variations thereof may be made without departing from the spirit or scope of the invention.

What is claimed is:

1. A shock limiter system for a head suspension configured to engage with an external structure in a rigid disk drive, the head suspension having a flexure with a head slider oriented in a first direction over a disk surface, the head suspension including a load beam having a mounting region, a rigid region and a spring region located between the mounting region and rigid region, the rigid region and the flexure defining a distal region of the head suspension, the shock limiter system comprising:

a shock limiter comprising an elastically deformable spring member integrally formed from a piece of material comprising the load beam and extending from the distal region in a second direction generally opposite the first direction, the shock limiter being positioned to engage with the external structure to limit movement of the head suspension away from the disk surface during a shock event.

2. The shock limiter system of claim 1 wherein the shock limiter is located on the rigid region.

3. The shock limiter system of claim 1 wherein the shock limiter is located on the flexure.

4. The shock limiter system of claim 1 wherein the shock limiter comprises a curved structure.

5. The shock limiter system of claim 1 wherein the shock limiter comprises a tip configured to engage with the external structure.

6. The shock limiter system of claim 1 wherein the shock limiter comprises a tip adjacent to the head slider.

7. The shock limiter system of claim 1 wherein the shock limiter deforms elastically during the shock event.

8. A shock limiter system for a head suspension in a rigid disk drive, the head suspension having a flexure with a head slider oriented in a first direction over a disk surface, the head suspension including a load beam having a mounting region, a rigid region and a spring region located between the mounting region and rigid region, the rigid region and the flexure defining a distal region of the head suspension, the shock limiter system comprising:

a shock limiter comprising an elastically deformable spring member integrally formed from a piece of material comprising the load beam and extending from the distal region in a second direction generally opposite the first direction; and an external structure located opposite the shock limiter and positioned to limit movement of the head suspension away from the disk surface during a shock event.

9. The shock limiter system of claim 8 wherein the shock limiter is located on the rigid region.

10. The shock limiter system of claim 8 wherein the shock limiter is located on the flexure.

11. The shock limiter system of claim 8 wherein the shock limiter comprises a curved structure.

12. The shock limiter system of claim 8 wherein the shock limiter comprises a tip configured to engage with the external structure.

13. The shock limiter system of claim 8 wherein the shock limiter comprises a tip adjacent to the head slider.

14. The shock limiter system of claim 8 wherein the external structure comprises a portion of an actuator arm.

15. The shock limiter system of claim 8 wherein the external structure comprises a portion of the rigid disk drive.

16. The shock limiter system of claim 8 wherein the external structure comprises a back-to-back head suspension.

17. The shock limiter system of claim 8 wherein the external structure comprises a shock limiter on a back-to-back head suspension.

18. The shock limiter system of claim 8 wherein the shock limiter deforms elastically during the shock event.

19. A shock limiter system for first and second back-to-back head suspensions in a head stack assembly, the head suspensions having first and second flexures supporting first and second head sliders over first and second disk surfaces in a rigid disk drive, respectively, the first and second head suspensions each including a load beam having a mounting region, a rigid region and a spring region located between the mounting region and rigid region, the first rigid region and the first flexure defining a first distal region, the shock limiter system comprising:

a first shock limiter comprising an elastically deformable spring member formed from a piece of material comprising the load beam, the first shock limiter extending toward the second head suspension to limit movement of the first and second head suspensions away from the first and second disk surfaces during a shock event.

20. The shock limiter system of claim 19 wherein the first shock limiter is located on the rigid region.

21. The shock limiter system of claim 19 wherein the first shock limiter is located on the flexure.

22. The shock limiter system of claim 19 wherein the first shock limiter is integrally formed with the distal region.

23. The shock limiter system of claim 19 wherein the first shock limiter comprises a curved structure.

24. The shock limiter system of claim 19 wherein the first shock limiter comprises a tip configured to engage with the external structure.

25. The shock limiter system of claim 19 wherein the first shock limiter comprises a tip adjacent to the head slider.

26. The shock limiter system of claim 19 wherein the first shock limiter limits movement of the first and second head suspensions away from the first and second disk surfaces during operation of the rigid disk drive.

27. The shock limiter system of claim 19 wherein the second rigid region and the second flexure define a second distal region, the shock limiter system comprising:

a second shock limiter formed in the second distal region, the second shock limiter extending toward the first head suspension to limit movement of the first and second head suspensions away from the first and second disk surfaces during a shock event.

28. The shock limiter system of claim 27 wherein the first and second shock limiters cooperate to limit movement of the first and second head suspensions away from the first and second disk surfaces during a shock event.

29. The shock limiter system of claim 19 wherein the shock limiter deforms elastically during the shock event.

30. A shock limiter system for a head suspension configured to engage with an external structure in a rigid disk drive, the head suspension having a flexure with a head slider oriented in a first direction over a disk surface, the head suspension including a load beam having a mounting region, a rigid region and a spring region located between the mounting region and rigid region, the rigid region and the flexure defining a distal region of the head suspension, the shock limiter system comprising:

a shock limiter comprising an elastically deformable spring member integrally formed from a piece of material comprising the flexure and extending from the distal region in a second direction generally opposite the first direction, the shock limiter being positioned to engage with the external structure to limit movement of the head suspension away from the disk surface during a shock event.

31. A shock limiter system for a head suspension in a rigid disk drive, the head suspension having a flexure with a head slider oriented in a first direction over a disk surface, the head suspension including a load beam having a mounting region, a rigid region and a spring region located between the mounting region and rigid region, the rigid region and the flexure defining a distal region of the head suspension, the shock limiter system comprising:

a shock limiter comprising an elastically deformable spring member integrally formed from a piece of material comprising the flexure and extending from the distal region in a second direction generally opposite the first direction; and an external structure located opposite the shock limiter and positioned to limit movement of the head suspension away from the disk surface during a shock event.

32. A shock limiter system for first and second back-to-back head suspensions in a head stack assembly, the head suspensions having first and second flexures supporting first and second head sliders over first and second disk surfaces in a rigid disk drive, respectively, the first and second head suspensions each including a load beam having a mounting region, a rigid region and a spring region located between the mounting region and rigid region, the first rigid region and the first flexure defining a first distal region, the shock limiter system comprising:

a first shock limiter comprising an elastically deformable spring member formed from a piece of material comprising the first flexure, the first shock limiter extending toward the second head suspension to limit movement of the first and second head suspensions away from the first and second disk surfaces during a shock event.

* * * * *